US012801897B2

(12) United States Patent
Liu et al.

(10) Patent No.: US 12,801,897 B2
(45) Date of Patent: Nov. 17, 2026

(54) DEFENSE METHOD AND APPARATUS, ELECTRONIC DEVICE, AND STORAGE MEDIUM

(71) Applicant: TSINGHUA UNIVERSITY, Beijing (CN)

(72) Inventors: Yang Liu, Beijing (CN); Zaiqing Nie, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 380 days.

(21) Appl. No.: 18/706,011

(22) PCT Filed: Jul. 12, 2022

(86) PCT No.: PCT/CN2022/105120

§ 371 (c)(1),
(2) Date: Apr. 30, 2024

(87) PCT Pub. No.: WO2023/077857

PCT Pub. Date: May 11, 2023

(65) Prior Publication Data

US 2026/0161925 A1 Jun. 11, 2026

(30) Foreign Application Priority Data

Nov. 3, 2021 (CN) .......................... 202111291143.9

(51) Int. Cl.
*G06N 3/0455* (2023.01)

(52) U.S. Cl.
CPC .................................. *G06N 3/0455* (2023.01)

(58) Field of Classification Search
CPC ........ G06N 3/0455; G06N 3/04; G06N 3/045; G06N 3/0464; G06N 3/0475; G06N 3/08;
(Continued)

(56) References Cited

U.S. PATENT DOCUMENTS

2020/0175362 A1* 6/2020 Zhang ...................... G06N 3/04
2021/0051169 A1* 2/2021 Karame ................. G06N 3/098
(Continued)

FOREIGN PATENT DOCUMENTS

CN 112016697 A * 12/2020 ............. G06N 20/00
CN 113190841 A 7/2021
(Continued)

OTHER PUBLICATIONS

International Search Report for PCT/CN2022/105120 mailed Aug. 25, 2022, ISA/CN.

*Primary Examiner* — Michael Jared Walker
(74) *Attorney, Agent, or Firm* — Yue (Robert) Xu; Apex Attorneys at Law, LLP

(57) ABSTRACT

A defense method, a defense apparatus, an electronic device, and a storage medium are provided. The defense method includes performing, by an autoencoder, autoencoding on an input label to form a soft label; decoding, by a decoder, the soft label to form a decoding label; calculating a first loss function based on the input label, the soft label and the decoding label; determining whether the first loss function converges; and training the autoencoder and the decoder by using the first loss function to obtain a trained autoencoder and a trained decoder, and going to the process of performing, by an autoencoder, autoencoding on an input label to form a soft label, if the first loss function does not converge.

13 Claims, 8 Drawing Sheets

(58) Field of Classification Search
CPC ........ G06N 3/088; G06N 3/094; G06N 3/098; G06N 20/00; H04L 63/1441; G06F 18/214
See application file for complete search history.

(56) References Cited

U.S. PATENT DOCUMENTS

| | | | | |
|---|---|---|---|---|
| 2022/0083840 | A1* | 3/2022 | Luong .................... | G06N 20/00 |
| 2022/0335303 | A1* | 10/2022 | Haidar .................. | G06N 3/045 |

FOREIGN PATENT DOCUMENTS

| | | | |
|---|---|---|---|
| CN | 113297573 | A | 8/2021 |
| CN | 113726823 | A | 11/2021 |
| WO | 2021158313 | A1 | 8/2021 |

* cited by examiner

DEFENSE METHOD AND APPARATUS, ELECTRONIC DEVICE, AND STORAGE MEDIUM

This application is a national phase application of PCT international patent application PCT/CN2022/105120, filed on Jul. 12, 2022 which claims priority to Chinese Patent Application No. 202111291143.9, titled "DEFENSE METHOD AND APPARATUS, ELECTRONIC DEVICE, AND STORAGE MEDIUM", filed on Nov. 3, 2021 with the China National Intellectual Property Administration, both of which are incorporated herein by reference in their entireties.

FIELD

The present disclosure relates to the technical field of attack and defense, in particular to a defense method, a defense apparatus, an electronic device, and a storage medium.

BACKGROUND

In the conventional protection techniques, measures of differential privacy and gradient sparsity are used to defend against a gradient-based label recovery attack and a gradient-replacement attack in vertical federated learning. Although the above two defense measures can defend against attacks to a certain extent, the implementation of the two measures is based on poor accuracy of the main task model.

SUMMARY

An object of the present disclosure is to provide a defense method, a defense apparatus, an electronic device and a storage medium, to ensure the main task accuracy while defending against the attacks described above.

In order to achieve the above objects, a defense method is provided according to the present disclosure. The method includes:

in step 1, performing, by an autoencoder, autoencoding on an input label to form a soft label;

in step 2, decoding, by a decoder, the soft label to form a decoding label;

in step 3, calculating a first loss function based on the input label, the soft label and the decoding label;

in step 4, determining whether the first loss function converges; and in step 5, training the autoencoder and the decoder by using the first loss function to obtain a trained autoencoder and a trained decoder and going to step 1, if the first loss function does not converge.

Preferably, the first loss function is expressed by using the following equation:

$$L1 = L_{contra} - \lambda_1 L_{entropy}$$

where, L1 represents the first loss function, $L_{contra}$ represents a first component, $L_{entropy}$ represents a second component, and $\lambda_1$ represents an adjustable hyper-parameter.

Preferably, the first component is expressed by using the following equation:

$$L_{contra} = CE(Y_{label}, \hat{Y}) - \lambda_2 CE(Y_{label}, \tilde{Y})$$

where, $L_{contra}$ represents the first component, $Y_{label}$ represents the input label, $\tilde{Y}$ represents the soft label, $\hat{Y}$ represents the decoding label, CE represents a cross entropy loss function, and $\lambda_2$ represents an adjustable hyper-parameter.

Preferably, the second component is expressed by using the following equation:

$$L_{entropy} = \text{Entropy}(\tilde{Y})$$

where, $L_{entropy}$ represents the second component and Entropy represents an entropy function.

Preferably, a difference between the soft label and the input label is greater than a first preset difference, a difference between the decoding label and the input label is less than a second preset difference, and a divergence degree of the soft label is greater than a preset divergence degree.

Compared with the conventional technology, in the defense method according to the present disclosure, an autoencoder first performs autoencoding on an input label to form a soft label, then a decoder decodes the soft label to form a decoding label, and a first loss function is calculated based on the input label, the soft label and the decoding label. If the first loss function does not converge, the autoencoder and the decoder are trained using the calculated first loss function, the trained autoencoder performs autoencoding on the input label again, the trained decoder re-decodes the soft label, and the first loss function is re-calculated based on the re-encoded soft label and the re-decoded decoding label. The above process is performed iteratively until the first loss function converges. If the first loss function converges, it indicates that the decoding label decoded by the trained decoder is almost lossless compared to the input label, and the soft label encoded by the trained autoencoder differs greatly from the input label. Moreover, the soft label encoded by the trained autoencoder has a very high divergence degree, that is, the probabilities that the input label is mapped to multiple other soft labels by the autoencoder are relatively equal. The input label may be mapped to multiple different soft labels by the trained autoencoder, effectively confusing the attacker. Moreover, on the basis of the defense, the decoding label differs little from the input label and is almost lossless, thereby ensuring the main task accuracy.

A defense apparatus is further provided according to the present disclosure. The apparatus includes an encoding module, a decoding module, a first loss function calculation module, a convergence determination module and a training module.

The encoding module is configured to perform autoencoding on an input label by an autoencoder to form a soft label;

The decoding module is configured to decode the soft label by a decoder to form a decoding label;

The first loss function calculation module is configured to calculate a first loss function based on the input label, the soft label and the decoding label;

The convergence determination module is configured to determine whether the first loss function converges.

The training module is configured to train the autoencoder and the decoder by using the first loss function, update the soft label by the trained autoencoder, update the decoding label by the trained decoder, and re-calculate the first loss function, if the first loss function does not converge.

Preferably, the first loss function is expressed by using the following equation:

$$L1 = L_{contra} - \lambda_1 L_{entropy}$$

where, L1 represents the first loss function, $L_{contra}$ represents a first component, $L_{entropy}$ represents a second component, and $\lambda_1$ represents an adjustable hyper-parameter.

Preferably, the first component is expressed by using the following equation:

$$L_{contra} = CE(Y_{label}, \hat{Y}) - \lambda_2 CE(Y_{label}, \tilde{Y})$$

where, $L_{contra}$ represents the first component, $Y_{label}$ represents the input label, $\tilde{Y}$ represents the soft label, $\hat{Y}$ represents the decoding label, CE represents a cross entropy loss function, and $\lambda_2$ represents an adjustable hyper-parameter.

The second component is expressed by using the following equation:

$$L_{entropy} = \text{Entropy}(\tilde{Y})$$

where, $L_{entropy}$ represents the second component and Entropy represents an entropy function.

Compared with the conventional technology, the defense apparatus according to the present disclosure has the same beneficial effects as the defense method described in the above embodiments, and the beneficial effects are not repeated here.

An electronic device is further provided according to the present disclosure. The electronic device includes: a bus, a transceiver (a display unit/an output unit, an input unit), a memory, a processor and a computer program that is stored in the memory and executable by the processor. The transceiver, the memory, and the processor are connected to each other via the bus. The computer program, when executed by the processor, implements steps of the defense method described above.

Compared with the conventional technology, the electronic device according to the present disclosure has the same beneficial effects as the defense method described in the above technical solutions, and the beneficial effects are not repeated here.

A computer-readable storage medium storing a computer program is further provided according to the present disclosure. The computer program, when executed by a processor, implements steps of the defense method described above.

Compared with the conventional technology, the computer readable storage medium according to the present disclosure has the same beneficial effects as the defense method described in the above technical solutions, and the beneficial effects are not repeated here.

Preferred embodiments are described below in detail with reference to the drawings so that the above objects, features and advantages of the present disclosure are readily understandable.

BRIEF DESCRIPTION OF THE DRAWINGS

In order to more clearly illustrate technical solutions in embodiments of the present disclosure or in the conventional technology, drawings to be used in the description of the embodiments or the conventional technology are briefly described hereinafter. It is apparent that the drawings described below show only the embodiments of the present disclosure, and other drawings may be obtained by those skilled in the art from the drawings without any creative work.

DETAILED DESCRIPTION OF THE EMBODIMENTS

The technical solutions of the embodiments of the present disclosure are described clearly and completely below in conjunction with the drawings of the embodiments of the present disclosure. Apparently, the described embodiments are only some of the embodiments of the present disclosure, rather than all of the embodiments. Based on the embodiments of the present disclosure, all of the other embodiments which are obtained by those skilled in the art without any creative work fall within the protection scope of the present disclosure.

In the description of the embodiments of the present disclosure, the terms "first" and "second" are used for descriptive purposes only, and should not be understood as indicating or implying relative importance or implicitly indicating the number of indicated technical features. Therefore, the feature defined by "first" and "second" may explicitly or implicitly be one or more in number. In the description of the present disclosure, the meaning of "multiple" is two or more, unless specifically defined otherwise.

Before introducing the embodiments of the present disclosure, the relevant terms involved in the embodiments of the present disclosure are first explained as follows.

Vertical Federated Learning (abbreviated as VFL) is a process of vertically partitioning datasets (i.e., feature dimension) and extracting, from two datasets having more overlapping users but less overlapping user features, data with the same user but not completely the same user feature for training.

Confusing AutoEncoder (abbreviated as CoAE) is a general term for an autoencoder and a decoder used in the present disclosure.

Figure 1:
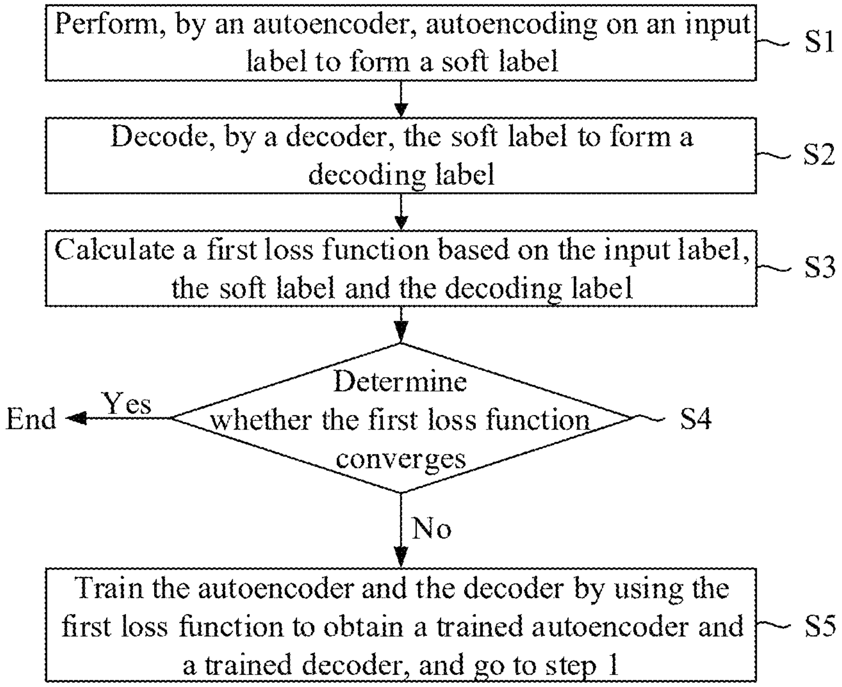
FIG. 1 is a flowchart of a defense method according to an embodiment of the present disclosure.
Figure 2:
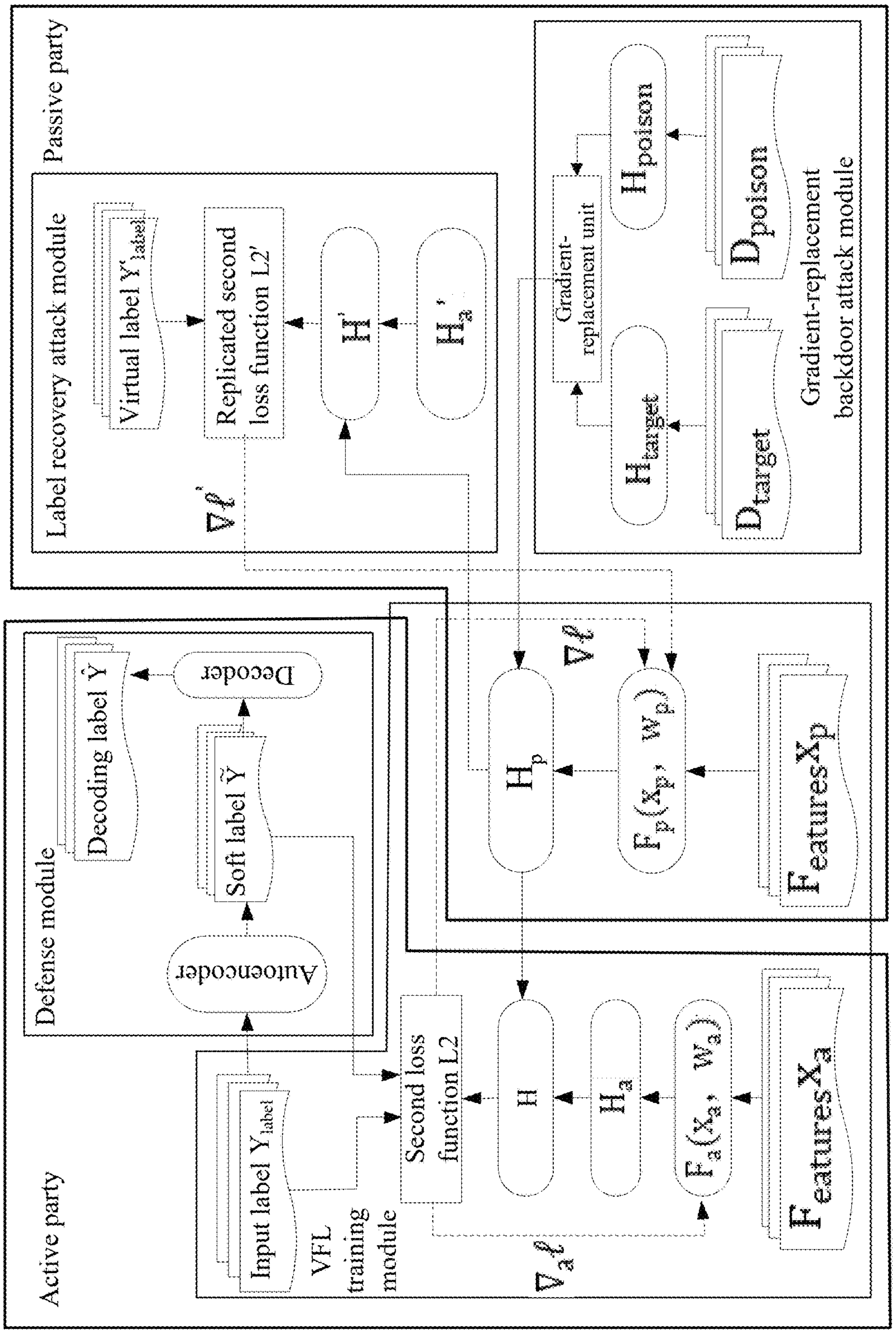
FIG. 2 is a diagram illustrating architecture of attack and defense according to an embodiment of the present disclosure.
Figure 3:
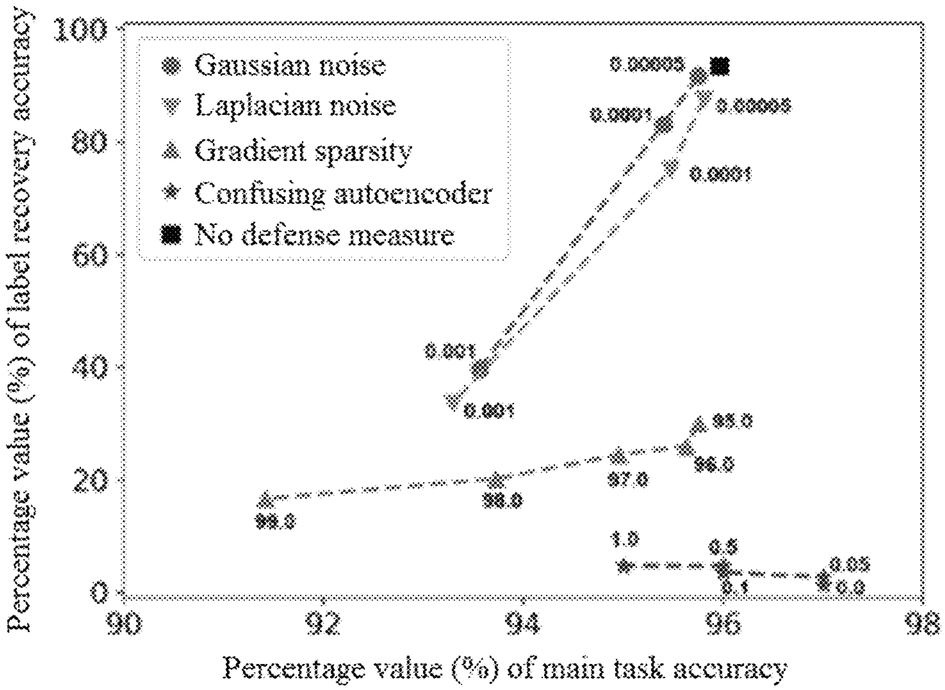
FIG. 3 is a schematic diagram illustrating a relationship between defensing against a MNIST dataset-based label recovery attack and a main task accuracy according to an embodiment of the present disclosure.
Figure 4:
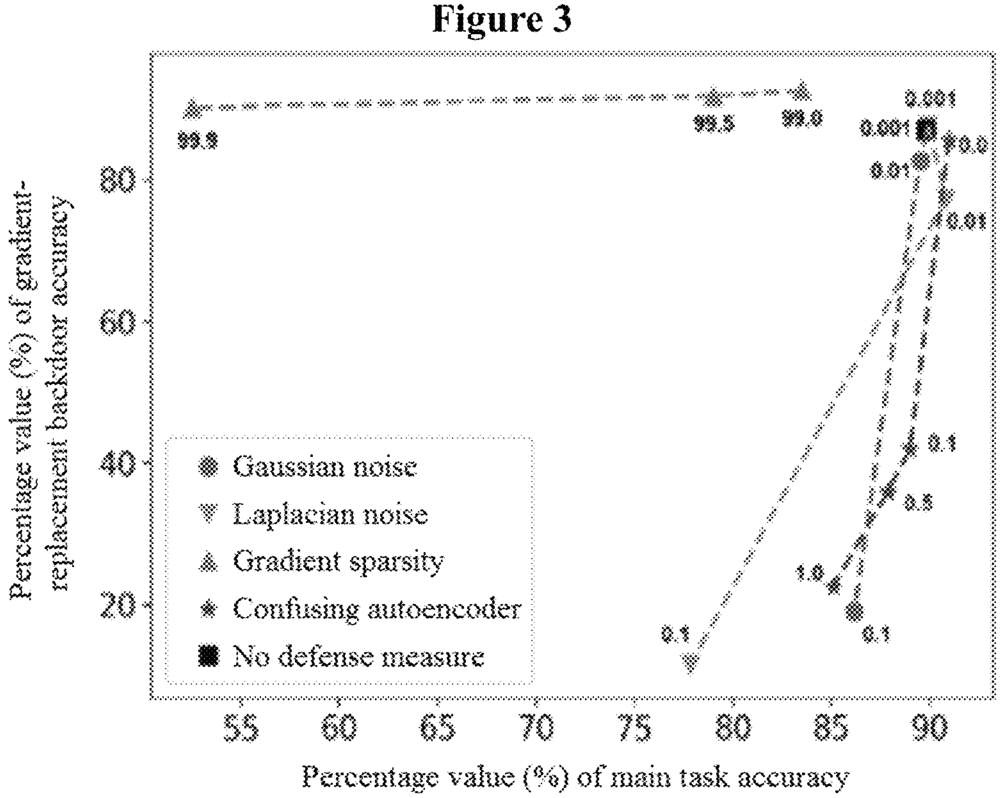
FIG. 4 is a schematic diagram illustrating a relationship between defensing against a MNIST dataset-based gradient-replacement backdoor attack and a main task accuracy according to an embodiment of the present disclosure.
Figure 5:
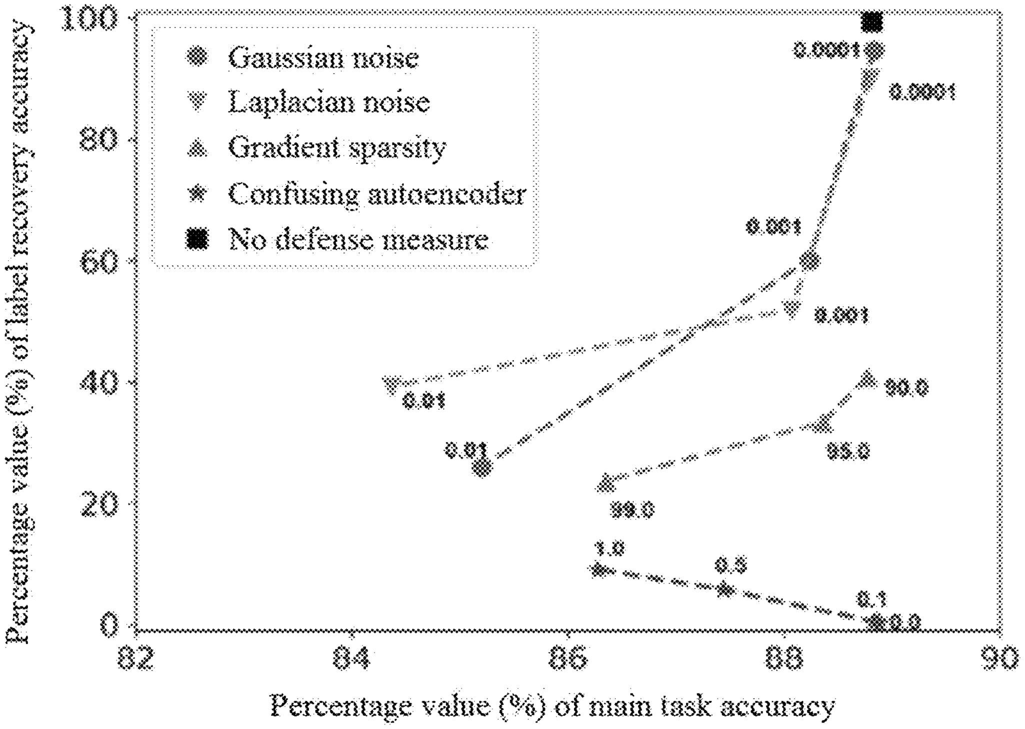
FIG. 5 is a schematic diagram illustrating a relationship between defensing against a NUSWIDE dataset-based label recovery attack and a main task accuracy according to an embodiment of the present disclosure.
Figure 6:
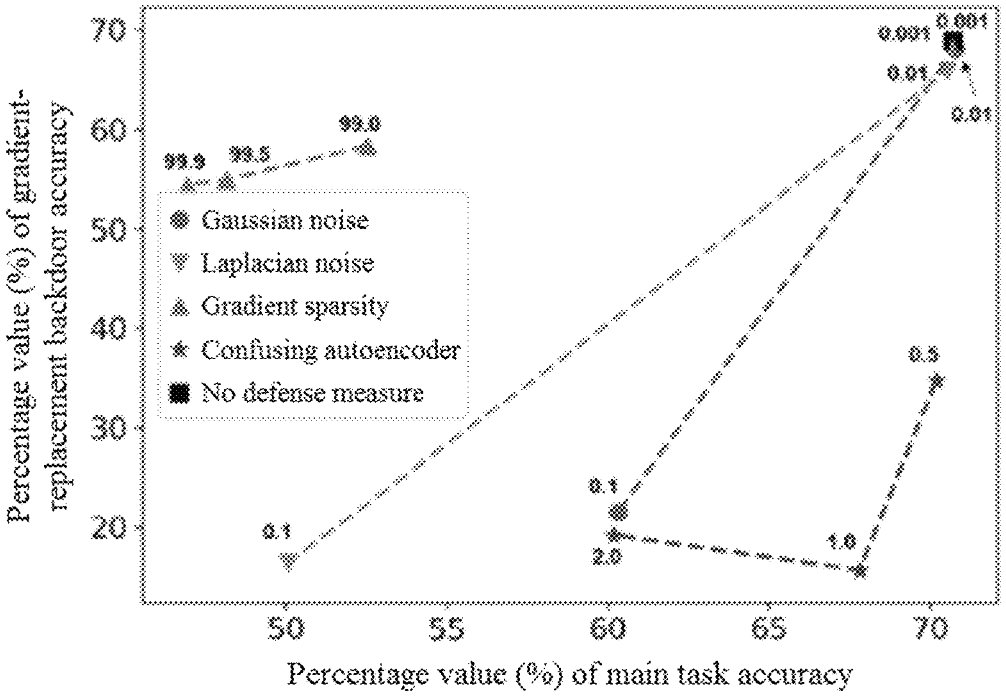
FIG. 6 is a schematic diagram illustrating a relationship between defensing against a NUSWIDE dataset-based gradient-replacement backdoor attack and a main task accuracy according to an embodiment of the present disclosure.
Figure 7:
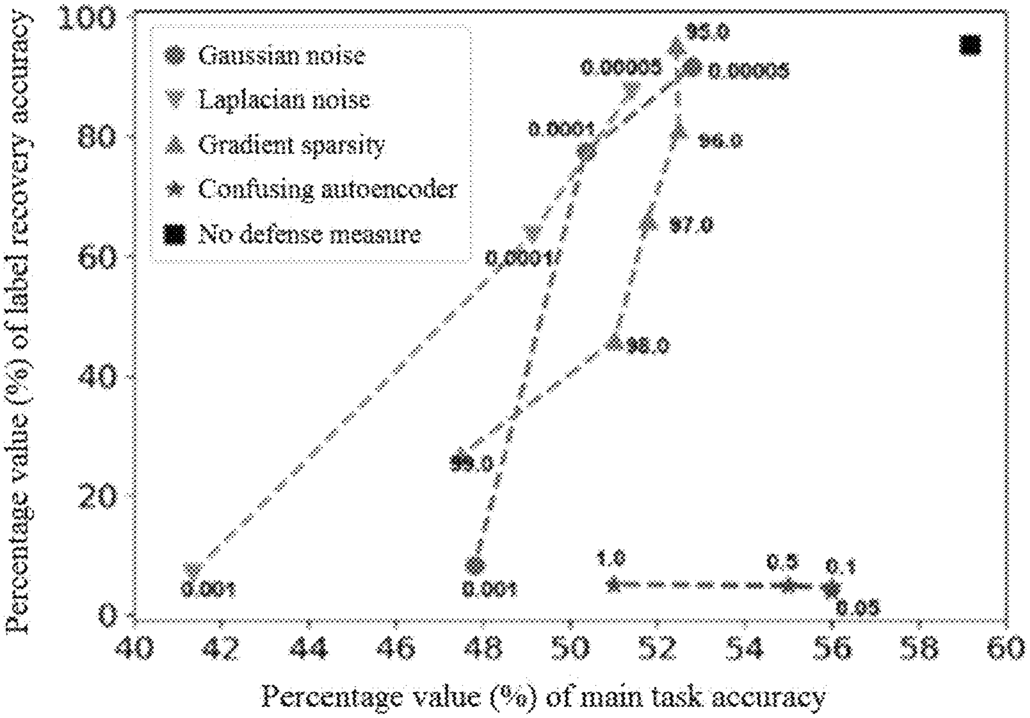
FIG. 7 is a schematic diagram illustrating a relationship between defensing against a CIFAR20 dataset-based label recovery attack and a main task accuracy according to an embodiment of the present disclosure.
Figure 8:
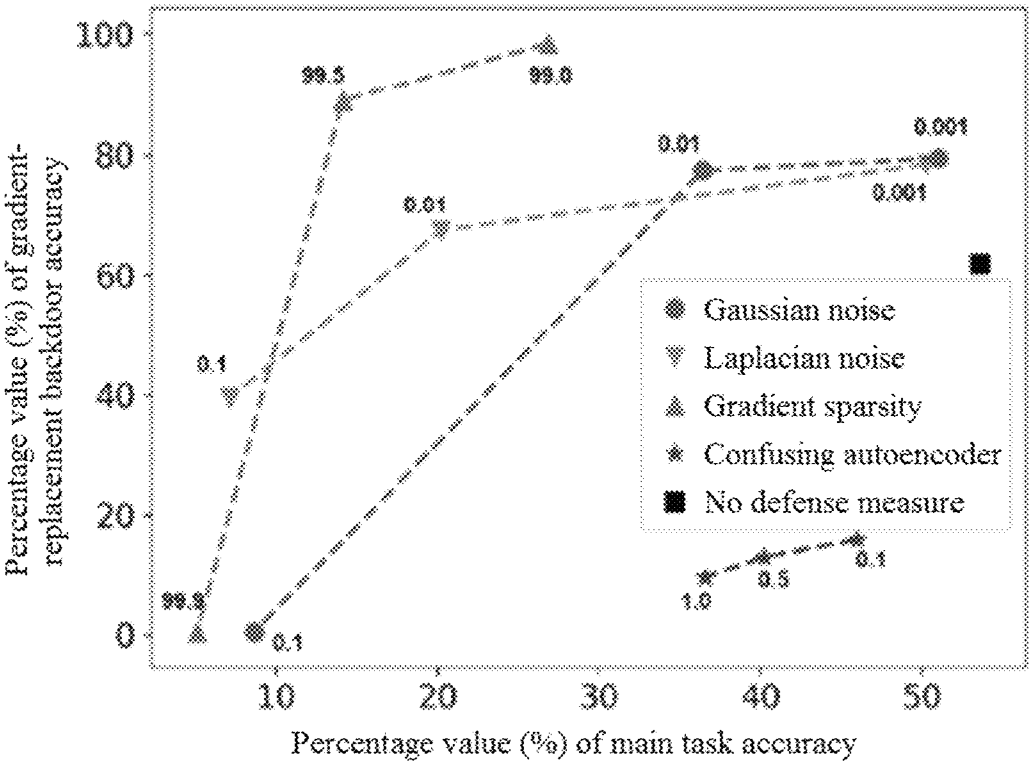
FIG. 8 is a schematic diagram illustrating a relationship between defensing against a CIFAR20 dataset-based gradient-replacement backdoor attack and a main task accuracy according to an embodiment of the present disclosure.

FIG. 1 is a flowchart of a defense method according to an embodiment of the present disclosure. FIG. 2 is a diagram illustrating architecture of attack and defense according to an embodiment of the present disclosure. In order to better understand the principle of the defense mechanism, an operating mechanism of each part is introduced below in conjunction with FIGS. 1 and 2. As shown in FIG. 1, the method includes the following steps 1 to 5.

In step 1, an autoencoder performs autoencoding on an input label to form a soft label.

As shown in FIG. 2, architecture of the defense illustrates an active party and a passive party. The active party may act as a defender and the passive party may act as an attacker. The input label is distributed on the active party. The autoencoder is distributed in a defense module in the active party. The autoencoder performs autoencoding on the input label to form the soft label. It should be understood that the soft label is also distributed in the defense module. It should be noted that the autoencoder and the decoder here are collectively referred to as Confusing AutoEncoder (CoAE).

In step 2, a decoder decodes the soft label to form a decoding label.

As shown in FIG. 2, a decoder decodes the soft label to form a decoding label. It should be understood that the decoder and the decoding label are also distributed in the defense module.

In step 3, a first loss function is calculated based on the input label, the soft label and the decoding label.

It should be noted that the first loss function is expressed by using the following equation:

$$L1 = L_{contra} - \lambda_1 L_{entropy}$$

$$L_{contra} = CE(Y_{label}, \hat{Y}) - \lambda_2 CE(Y_{label}, \tilde{Y})$$

$$L_{entropy} = \text{Entropy}(\tilde{Y})$$

where, L1 represents the first loss function, $L_{contra}$ represents a first component, $L_{entropy}$ represents a second component, $Y_{label}$ represents the input label, $\tilde{Y}$ represents the soft label, $\hat{Y}$ represents the decoding label, CE represents a cross entropy loss function, Entropy represents an entropy function, and $\lambda_1$ and $\lambda_2$ represent adjustable hyper-parameters.

According to the above equations, the first loss function L1 is calculated using the input label distributed on the active party, the soft label and the decoding label distributed in the defense module.

In step 4, it is determined whether the first loss function converges.

In step 5, if the first loss function does not converge, the autoencoder and the decoder are trained by using the first loss function L1 to obtain a trained autoencoder and a trained decoder, and the process goes to step 1.

It should be noted that if the first loss function L1 does not converge, the autoencoder and the decoder are trained using the calculated first loss function L1, that is, parameters of the autoencoder and the decoder are updated. After the autoencoder and the decoder are trained, the process goes to step 1. The trained autoencoder re-encodes the input label, and the trained decoder re-decodes the soft label. The first loss function L1 is re-calculated based on the re-encoded soft label and the re-decoded decoding label. The above process is performed iteratively until the first loss function L1 converges. When the first loss function L1 converges, the training of the autoencoder and the decoder is completed. For example, the number of iterations may be set, such as, set to epoch=30. After epoch=30 iterations, the training is terminated.

In an embodiment, if the first loss function L1 converges, a difference between the soft label and the input label is greater than a first preset difference, it indicates that the soft label encoded by the trained autoencoder differs greatly from the input label. Moreover, a difference between the decoding label and the input label is less than a second preset difference, that is, the decoding label decoded by the trained decoder is almost lossless compared to the input label, and differs little from the input label. Furthermore, a divergence degree of the soft label is greater than a preset divergence degree, that is, the soft label encoded by the trained autoencoder has a very high divergence degree. Probabilities that the input label is mapped to multiple other soft labels by the autoencoder are relatively equal, that is, the input label is mapped to other soft labels with an equal probability as much as possible through autoencoding, effectively confusing the attacker. Moreover, in the technical solutions according to the embodiments of the present disclosure, on the basis of defending against the attack, the decoding label differs little from the input label and is almost lossless, thereby ensuring the main task accuracy.

It should be noted that the autoencoder and the decoder are trained in above steps 1 to 5, to converge the first loss function L1. On the basis of defending against a label recovery attack and a gradient-replacement backdoor attack, the decoding label is almost lossless compared to the input label. Moreover, the soft label formed through autoencoding differs greatly from the input label. The probabilities that the input label is mapped to multiple other soft labels by the autoencoder are relatively equal, and the soft label has a relatively high divergence degree.

In another embodiment, after the autoencoder and the decoder are trained in the defense module, vertical federated learning is performed in a VFL training module. The active party defends against attacks from the passive party by replacing the input label with the soft label through defense technique (i.e., CoAE) in vertical federated learning.

It can be understood that, as shown in FIG. 2, in the VFL training module, data features $x_a$ and $x_p$ of a training model are distributed on the active party and the passive party, respectively. The active party holds a first differential model $F_a(x_a,w_a)$, and the passive party holds a second differential model $F_p(x_p,w_p)$. $F_{eatures}x_a$ provides the data feature $x_a$ for the first differential model $F_a(x_a,w_a)$, and $F_{eatures}x_p$ provides the data feature $x_p$ for the second differential model $F_p(x_p, w_p)$. $w_a$ represents a parameter of the first differential model $F_a(x_a,w_a)$, and $w_p$ represents a parameter of the second differential model $F_p(x_p,w_p)$. The first differential model $F_a(x_a,w_a)$ and the second differential model $F_p(x_p,w_p)$ have a same structure, for example, both use a same convolutional neural network resnet18, but do not share model parameters, that is, $w_a$ is private to the first differential model and $w_p$ is private to the second differential model. The training process of the VFL training module includes the following steps 101 to 103.

In step 101, the active party inputs the private data feature $w_a$ into the first differential model $F_a(x_a,w_a)$ to obtain Ha, the passive party inputs the private data feature $w_p$ into the second differential model $F_p(x_p,w_p)$ to obtain $H_p$, and the passive party transmits $H_p$ to the active party.

In step 102, the active party sums the resulting $H_a$ and $H_p$ to obtain H and calculates a loss function L2 using the input label or the soft label. For example, when there is no attack, no defense is needed, and the second loss function L2 is calculated using the input label. When there is a label recovery attack or a gradient-replacement backdoor attack, the defense is needed, and the second loss function L2 is calculated using the soft label formed by performing auto-encoding on the input label in the defense module.

In step 103, based on the calculated loss function L2 by using the backpropagation technique for the loss function L2, the active party transmits an updated gradient $\nabla_a \ell$ of the first differential model $F_a(x_a,w_a)$ back to the active party for updating the model parameter $w_a$, and transmits an updated gradient $\nabla \ell$ of the second differential model $F_p(x_p,w_p)$ back to the passive party for updating the model parameter $w_p$.

As shown in FIG. 2, the passive party includes a label recovery attack module and a gradient-replacement backdoor attack module.

As shown in FIG. 2, the passive party includes a label recovery attack module and a gradient-replacement backdoor attack module.

It should be noted that in the label recovery attack module, the passive party locally replicates an active party with a virtual label $$Y'_{label}$$

representing the input label $Y_{label}$ of the original active party, and $$H'_a$$

representing $H_a$ of the original active party, and performs the calculation process in the normal VFL training module of the active party to obtain an updated gradient $\nabla \ell'$ of a model. The virtual label $$Y'_{label}$$

is restored to the input label $Y_{label}$ by matching $\nabla \ell'$ and $\nabla \ell$. The algorithm process is performed as follows.

In step 201, the passive party replicates the label $Y_{label}$ and $H_a$ to randomly generate the virtual label $$Y'_{label}$$

and $$H'_a$$

In step 202, the passive party sums the $H_p$ and $$H'_a$$

to obtain H', and calculates a replicated second loss function L'2 using the virtual label $$Y'_{label}.$$

In step 203, the passive party obtains the updated gradient $\nabla \ell'$ of the model, based on the calculated replicated second loss function L'2 by using the backpropagation technique.

In step 204, a difference D between $\nabla \ell'$ and $\nabla \ell$ is calculated and $$H'_a$$

and the virtual label $$Y'_{label}$$

are continuously optimized through a backpropagation algorithm, which are expressed by the following equation:

$$\min_{H'_a, Y'_{label}} D\Delta\|\Delta\ell' - \nabla\ell\|^2$$

It should be noted that in the gradient-replacement backdoor attack module, target labels for several types of backdoor attacks are set and it is assumed that the passive party has known some samples $D_{target}$ whose labels belong to the target labels. This assumption is feasible and reasonable in practice. In addition, samples to be attacked are selected from a training set to form $D_{poison}$. The process of the attack algorithm is as follows.

In step 301, after $H_p$ is calculated through forward propagation, each $$H_p^i(i \in H_{poison}),$$

i.e., $H_{poison}$ in FIG. 2, is replaced with $$H_p^i(j \in H_{target}),$$

i.e., $H_{target}$ in FIG. 2, a tuple $\langle i, j \rangle$ is recorded, and then the replaced $H_p$ is transmitted to the active party for the normal VFL training.

In step 302, the passive party receives the updated gradient $\nabla \ell$ through backpropagation, and for all previously recorded $\langle i, j \rangle$, $\nabla \ell_i$ is replaced with $\gamma \nabla \ell_j$ (where $\gamma$ represents a hyper-parameter).

The scenarios and algorithms of attack and defense are completely described above. FIGS. 3 to 8 are diagrams illustrating defense effects of various defense measures on a label recovery attack and a gradient-replacement backdoor attack and impacts on the accuracy of a main task model on different datasets according to the embodiments of the present disclosure.

As shown in FIGS. 3 to 8, the defense effect is better and the impact on the main task accuracy is reduced as the curve moves further down to the right. It can be seen by comparison that the autoencoder and the decoder are trained, so that the first loss function L1 converges, effectively defensing against the label recovery attack and the gradient-replacement backdoor attack while ensuring the main task accuracy, reducing the success rate of both attacks and achieving a good defense effect. This technique is applied to the above data security detection platform, effectively ensuring the privacy security of user data in federated learning.

Compared with the conventional technology, in the defense method according to the present disclosure, an autoencoder first performs autoencoding on an input label to form a soft label, then a decoder decodes the soft label to form a decoding label, and a first loss function is calculated based on the input label, the soft label and the decoding label. If the first loss function does not converge, the autoencoder and the decoder are trained using the calculated first loss function, the trained autoencoder performs autoencoding on the input label again, the trained decoder re-decodes the soft label, and the first loss function is re-calculated based on the re-encoded soft label and the re-decoded decoding label. The above process is performed iteratively until the first loss function converges. If the first loss function converges, it indicates that the decoding label decoded by the trained decoder is almost lossless compared to the input label, and the soft label encoded by the trained autoencoder differs greatly from the input label. For example, the input label is $Y_{label}$[0,0,1], the decoding label is losslessly outputted as $\hat{Y}$[0,0,1], and the soft label is $\tilde{Y}$[0.4,0.3,0.3]. Moreover, the soft label encoded by the trained autoencoder has a very high divergence degree, that is, the probabilities that the input label is mapped to multiple other soft labels by the autoencoder are relatively equal. The input label may be mapped to multiple different soft labels by the trained autoencoder, effectively confusing the attacker. Moreover, on the basis of the defense, the decoding label differs little from the input label and is almost lossless, thereby ensuring the main task accuracy.

Figure 9:
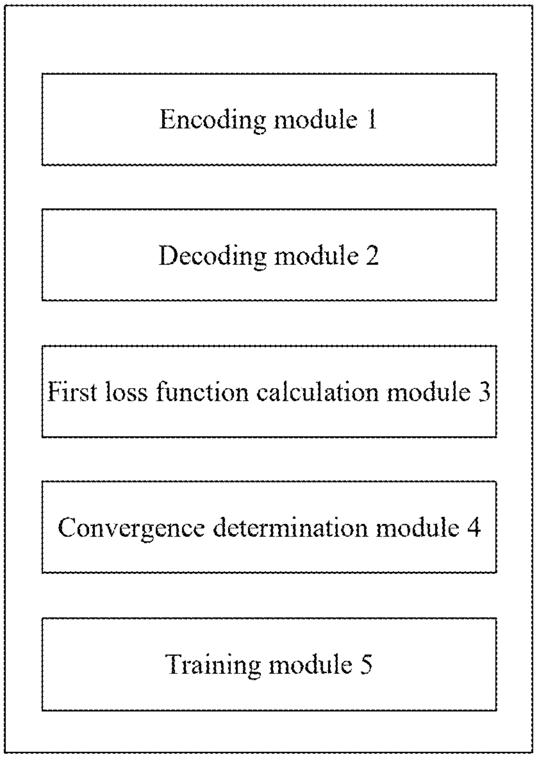
FIG. 9 is a schematic diagram of a defense apparatus according to an embodiment of the present disclosure.

As shown in FIG. 9, a defense apparatus is further provided according to the present disclosure. The apparatus includes an encoding module 1, a decoding module 2, a first loss function calculation module 3, a convergence determination module 4 and a training module 5.

The encoding module 1 is configured to perform autoencoding on an input label by an autoencoder to form a soft label.

The decoding module 2 is configured to decode the soft label by a decoder to form a decoding label.

The first loss function calculation module 3 is configured to calculate a first loss function based on the input label, the soft label and the decoding label.

The convergence determination module 4 is configured to determine whether the first loss function converges.

The training module 5 is configured to train the autoencoder and the decoder by using the first loss function, update the soft label by the trained autoencoder, update the decoding label by the trained decoder, and re-calculate the first loss function, if the first loss function does not converge.

Preferably, the first loss function is expressed by using the following equation:

$$L1 = L_{contra} - \lambda_1 L_{entropy}$$

where, L1 represents the first loss function, $L_{contra}$ represents a first component, $L_{entropy}$ represents a second component, and $\lambda_1$ represents an adjustable hyper-parameter.

Preferably, the first component is expressed by using the following equation:

$$L_{contra} = CE(Y_{label}, \hat{Y}) - \lambda_2 CE(Y_{label}, \tilde{Y})$$

where, $L_{contra}$ represents the first component, $Y_{label}$ represents the input label, Ý represents the soft label, $\hat{Y}$ represents the decoding label, CE represents a cross entropy loss function, and $\lambda_2$ represents an adjustable hyper-parameter.

The second component is expressed by using the following equation:

$$L_{entropy} = \text{Entropy}(\tilde{Y})$$

where, $L_{entropy}$ represents the second component, and Entropy represents an entropy function.

Compared with the conventional technology, the defense apparatus according to the present disclosure has the same beneficial effects as the defense method described in the above technical solutions, and the beneficial effects are not repeated here.

In addition, an electronic device is further provided according to an embodiment of the present disclosure. The electronic device includes a bus, a transceiver, a memory, a processor and a computer program that is stored in the memory and executable by the processor. The transceiver, the memory, and the processor are connected to each other via the bus. The computer program, when executed by the processor, implements various processes of the embodiment of the defense method described above, and can achieve the same technical effects. In order to avoid repetition, details are not repeated here.

Figure 10:
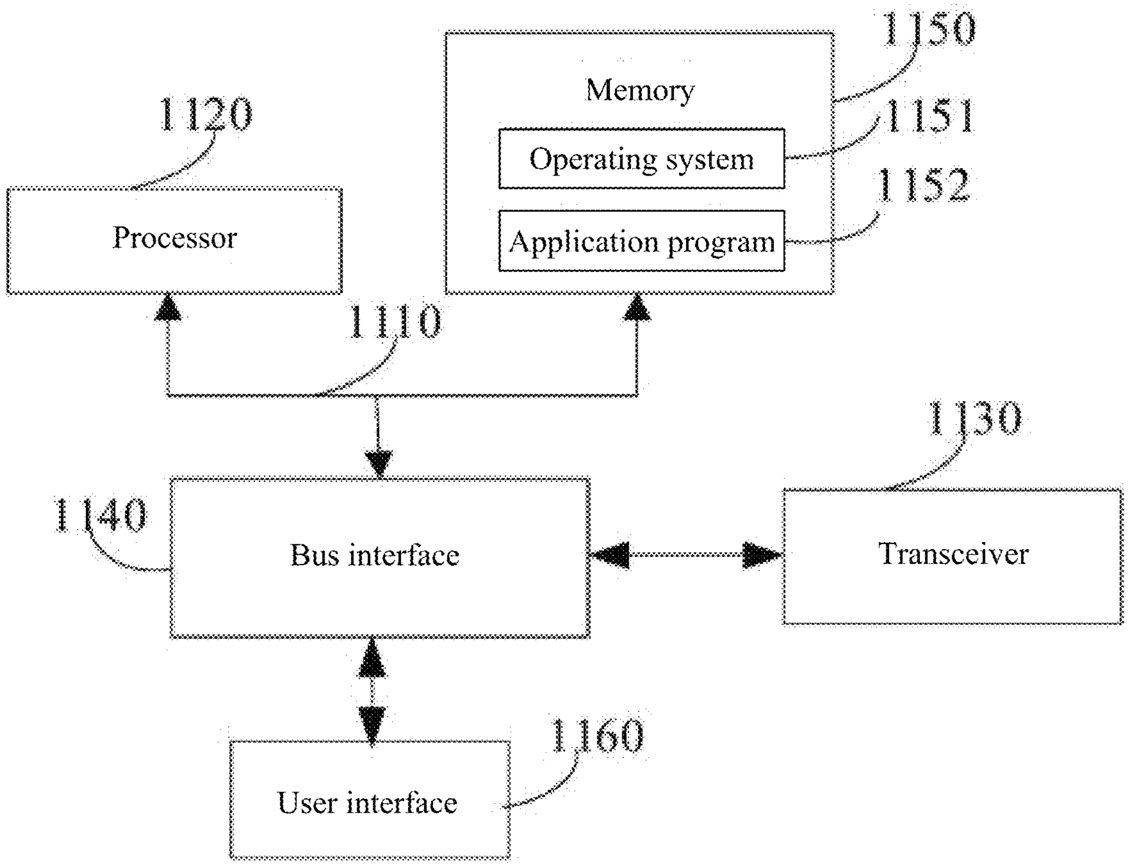
FIG. 10 is a schematic diagram of an electronic device for performing a defense method according to an embodiment of the present disclosure.

Specifically, referring to FIG. 10, the electronic device is further provided according to an embodiment of the present disclosure. The electronic device includes a bus 1110, a processor 1120, a transceiver 1130, a bus interface 1140, a memory 1150 and a user interface 1160.

In an embodiment of the present disclosure, the electronic device further includes a computer program stored in the memory 1150 and executable by the processor 1120. The computer program, when executed by the processor 1120, implements the various processes of the embodiment of the defense method described above.

The transceiver 1130 is configured to receive and transmit data under control of the processor 1120.

In the embodiment of the present disclosure, a bus structure (represented by the bus 1110) includes any number of interconnected buses and bridges. The bus 1110 connects various circuits including one or more processors represented by the processor 1120 and a memory represented by the memory 1150 together.

The bus 1110 represents one or more of any one of several types of bus structures, including a memory bus and a memory controller, a peripheral bus, an accelerate graphical port (AGP), a processor or a local bus using any bus structure among various bus architectures. For illustration rather than limitation, such architectures include: an industry standard architecture (ISA) bus, a micro channel architecture (MCA) bus, an enhanced ISA (EISA) bus, a video electronics standards association (VESA) bus and a peripheral component interconnect (PCI) bus.

The processor 1120 may be an integrated circuit chip with signal processing capabilities. In implementation, each step of the foregoing method embodiment may be completed by an integrated logic circuit of hardware or instructions in the form of software in the processor. The processor includes: a general-purpose processor, a central processing unit (CPU), a network processor (NP), a digital signal processor (DSP), an application specific integrated circuit (ASIC), a field programmable gate array (FPGA), a complex programmable logic device (CPLD), a programmable logic array (PLA), a microcontroller unit (MCU) or other programmable logic device, a discrete gate, a transistor logic device and a discrete hardware component. Various methods, steps, and logical block diagrams disclosed in the embodiments of the present disclosure may be implemented or performed. For example, the processor may be a single-core processor or a multi-core processor, and the processor may be integrated on a single chip or located on various chips.

The processor 1120 may be a microprocessor or any conventional processor. The steps of the method disclosed in the embodiments of the present disclosure may be directly performed by a hardware decoding processor, or may be performed by a combination of hardware and a software module in the decoding processor. The software module may be located in a readable storage medium known in the art such as a random-access memory (RAM), a flash memory, a read-only memory (ROM), a programmable ROM (PROM), an erasable PROM (EPROM) and a register. The readable storage medium is located in the memory. The processor reads information in the memory and performs the steps of the above method in combination with its hardware.

The bus 1110 further connects various other circuits such as a peripheral device, a voltage regulator, or a power management circuit, and the bus interface 1140 provides an interface between the bus 1110 and the transceiver 1130, which are well known in the art, and thus are not further described in the embodiments of the present disclosure.

The transceiver 1130 may be one element or multiple elements, for example, multiple receivers and transmitters, and provide a unit for communicating with various other devices on a transmission medium. For example, the transceiver 1130 is configured to receive external data from other devices, and transmit the data processed by the processor 1120 to other devices.

Depending on the nature of the computer system, a user interface 1160 may further be provided, including a touch screen, a physical keyboard, a display, a mouse, a speaker, a microphone, a trackball, a joystick and a stylus.

It should be understood that, in the embodiments of the present disclosure, the memory 1150 may further include memories remotely arranged with respect to the processor 1120. These remotely arranged memories may be connected to a server through a network. One or more parts of the above network may be an ad hoc network, an intranet, an extranet, a virtual private network (VPN), a local area network (LAN), a wireless local area network (WLAN), a wide area network (WAN), a wireless wide area network (WWAN), a metropolitan area network (MAN), the Internet (Internet), a public switched telephone network (PSTN), an plain old telephone service network (POTS), a cellular telephone network, a wireless network, a wireless fidelity (Wi-Fi) network and a combination of two or more of the foregoing networks. For example, the cellular telephone network and the wireless network may be a global system for mobile communication (GSM), a code division multiple access (CDMA) system, a world interoperability for microwave access (WiMAX) system, a general packet radio service (GPRS) system, a wideband code division multiple access (WCDMA) system, a long-term evolution (LTE) system, an LTE frequency division duplex (FDD) system, an LTE time division duplex (TDD) system, an advanced long-term evolution (LTE-A) system, a universal mobile telecommunications service (UMTS) system, an enhanced mobile broadband (eMBB) system, a massive machine type of communication (mMTC) system, a ultrareliable low latency communications (uRLLC) system and the like.

It should be understood that the memory 1150 in the embodiment of the present disclosure may be a volatile memory or a non-volatile memory, or may include both a volatile memory and a non-volatile memory. The non-volatile memory includes: a read-only memory (ROM), a programmable ROM (PROM), an erasable PROM (EPROM), an electrically EPROM (EEPROM) or a flash memory.

The volatile memory includes: a random-access memory (RAM), which serves as an external cache. For illustration rather than limitation, various RAMs are available, such as: a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct Rambus RAM (DRRAM). The memory 1150 of the electronic device described in the embodiments of the present disclosure includes but is not limited to the above memories and any other suitable types of memories.

In the embodiments of the present disclosure, the memory 1150 stores the following elements of an operating system 1151 and an application program 1152: executable modules, data structures, a subset thereof, or an extension set thereof.

Specifically, the operating system 1151 includes various system programs, such as a framework layer, a core library layer, or a driver layer, for implementing various basic services and processing hardware-based tasks. The application program 1152 includes various application programs, such as a media player and a browser, for implementing various application services. A program that implements the method according to the embodiments of the present disclosure may be included in the application program 1152. The application program 1152 includes: an applet, an object, a component, logic, a data structure, and other computer system executable instructions that perform specific tasks or implement specific abstract data types.

In addition, a computer-readable storage medium storing a computer program is further provided according to an embodiment of the present disclosure. The computer program, when executed by a processor, implements various processes of the embodiment of the defense method described above, and can achieve the same technical effects. In order to avoid repetition, details are not repeated here.

The computer-readable storage medium includes permanent and non-permanent, removable and non-removable media, and is a tangible device that retains and stores instructions executed by an instruction execution device. The computer-readable storage medium includes: an electronic storage device, a magnetic storage device, an optical storage device, an electromagnetic storage device, a semiconductor storage device, and any suitable combination thereof. The computer-readable storage medium includes: a phase-change random-access memory (PRAM), a static random-access memory (SRAM), a dynamic random-access memory (DRAM), other types of random-access memory (RAM), a read-only memory (ROM), a non-volatile random-access memory (NVRAM), an electrically erasable programmable read-only memory (EEPROM), a flash memory or other memories, a compact disc read-only memory (CD-ROM), a digital versatile disc (DVD) or other optical storage device, a magnetic cassette memory, a magnetic tape disk memory or other magnetic storage devices, a memory stick, a mechanical encoding device (such as a punched card or raised structure in a groove on which instructions are recorded) or any other non-transmission medium, and is configured to store information that can be accessed by a computing device. According to the definition in the embodiments of the present disclosure, the computer-readable storage medium does not include temporary signals, such as radio waves or other freely transmitted electromagnetic waves, electromagnetic waves transmitted through waveguides or other transmission media (such as a light pulse passing through an optical fiber cable) or electrical signals transmitted through wires.

In the embodiments of the present disclosure, it should be understood that the disclosed apparatus, electronic device, and method may be implemented in other ways. For example, the embodiments of the apparatus described above are only illustrative. For example, the division of the modules or units is only a logical function division, and there may be other division manners in actual implementation. For example, multiple units or components may be combined or integrated into another system, or some features may be omitted or not implemented. In addition, the shown or discussed mutual coupling or direct coupling or communication connection may be indirect coupling or communication connection through some interfaces, apparatuses or units, and may also be electrical, mechanical or other forms of connection.

The units described as separate components may or may not be physically separate. Components shown as units may or may not be a physical unit, that is, may be located in one position or distributed on multiple network units. Some or all of the units may be selected according to actual needs to solve the problems to be solved by the solutions of the embodiments of the present disclosure.

In addition, the functional units in the various embodiments of the present disclosure may be integrated into one processing unit, or the units may separate physically, or two or more units may be integrated into one unit. The integrated unit described above may be implemented by hardware or a software functional unit.

If the integrated unit is implemented by the software functional unit and sold or used as an independent product, the integrated unit may be stored in one computer-readable storage medium. Based on this understanding, the technical solutions of the embodiments of the present disclosure are essentially or a part that contributes to the conventional technology, or all or part of the technical solutions may be embodied in the form of a software product. The computer software product is stored in a storage medium and includes several instructions so that a computer device (such as a personal computer, a server, a data center or other network device) executes all or part of the steps of the method described in the embodiments of the present disclosure. The foregoing storage medium includes various media capable of storing program codes as listed above.

Embodiments of the present disclosure are described above. However, the protection scope of the present disclosure is not limited thereto. Changes and substitutions readily obtained by those skilled in the art within the technical scope disclosed in the present disclosure should fall within the protection scope of the present disclosure. Therefore, the protection scope of the present disclosure should be determined by the protection scope of the claims.

The invention claimed is:

1. A defense method, comprising:

in step 1, performing, by an autoencoder, autoencoding on an input label to form a soft label;

in step 2, decoding, by a decoder, the soft label to form a decoding label;

in step 3, calculating a first loss function based on the input label, the soft label and the decoding label;

in step 4, determining whether the first loss function converges; and in step 5, training the autoencoder and the decoder by using the first loss function to obtain a trained autoencoder and a trained decoder and going to step 1, if the first loss function does not converge.

2. The defense method according to claim 1, wherein the first loss function is expressed by using the following equation:

$$L1 = L_{contra} - \lambda_1 L_{entropy}$$

wherein, L1 represents the first loss function, $L_{contra}$ represents a first component, $L_{entropy}$ represents a second component, and $\lambda_1$ represents an adjustable hyper-parameter.

3. The defense method according to claim 2, wherein the first component is expressed by using the following equation:

$$L_{contra} = CE(Y_{label}, \hat{Y}) - \lambda_2 CE(Y_{label}, \tilde{Y})$$

wherein, $L_{contra}$ represents the first component, $Y_{label}$ represents the input label, Y represents the soft label, $\hat{Y}$ represents the decoding label, CE represents a cross entropy loss function, and $\lambda_2$ represents an adjustable hyper-parameter.

4. The defense method according to claim 2, wherein the second component is expressed by using the following equation:

$$L_{entropy} = \text{Entropy}(\tilde{Y})$$

wherein, $L_{entropy}$ represents the second component and Entropy represents an entropy function.

5. The defense method according to claim 1, wherein, a difference between the soft label and the input label is greater than a first preset difference;

a difference between the decoding label and the input label is less than a second preset difference; and a divergence degree of the soft label is greater than a preset divergence degree.

6. A defense apparatus, comprising:

an encoding module, configured to perform autoencoding on an input label by an autoencoder to form a soft label;

a decoding module, configured to decode the soft label by a decoder to form a decoding label;

a first loss function calculation module, configured to calculate a first loss function based on the input label, the soft label and the decoding label;

a convergence determination module, configured to determine whether the first loss function converges; and a training module, configured to train the autoencoder and the decoder by using the first loss function, update the soft label by the trained autoencoder, update the decoding label by the trained decoder, and re-calculate the first loss function, if the first loss function does not converge.

7. The defense apparatus according to claim 6, wherein the first loss function is expressed by using the following equation:

$$L1 = L_{contra} - \lambda_1 L_{entropy}$$

wherein, L1 represents the first loss function, $L_{contra}$ represents a first component, $L_{entropy}$ represents a second component, and $\lambda_1$ represents an adjustable hyper-parameter.

8. The defense apparatus according to claim 7, wherein the first component is expressed by using the following equation:

$$L_{contra} = CE(Y_{label}, \hat{Y}) - \lambda_2 CE(Y_{label}, \tilde{Y})$$

wherein, $L_{contra}$ represents the first component, $Y_{label}$ represents the input label, $\tilde{Y}$ represents the soft label, $\hat{Y}$ represents the decoding label, CE represents a cross entropy loss function, and $\lambda_2$ represents an adjustable hyper-parameter;

the second component is expressed by using the following equation:

$$L_{entropy} = \text{Entropy}(\tilde{Y})$$

wherein, $L_{entropy}$ represents the second component and Entropy represents an entropy function.

9. An electronic device, comprising: a bus, a transceiver (a display unit/an output unit, an input unit), a memory, a processor and a computer program that is stored in the memory and executable by the processor, wherein the transceiver, the memory and the processor are connected to each other via the bus, and the computer program, when executed by the processor, performs steps of the defense method according to claim 1.

10. A computer-readable storage medium storing a computer program, wherein the computer program, when executed by a processor, performs steps of the defense method according to claim 1.

11. The defense method according to claim 2, wherein, a difference between the soft label and the input label is greater than a first preset difference;

a difference between the decoding label and the input label is less than a second preset difference; and a divergence degree of the soft label is greater than a preset divergence degree.

12. The defense method according to claim 3, wherein, a difference between the soft label and the input label is greater than a first preset difference;

a difference between the decoding label and the input label is less than a second preset difference; and a divergence degree of the soft label is greater than a preset divergence degree.

13. The defense method according to claim 4, wherein, a difference between the soft label and the input label is greater than a first preset difference;

a difference between the decoding label and the input label is less than a second preset difference; and a divergence degree of the soft label is greater than a preset divergence degree.

* * * * *